Dec. 18, 1934.  H. A. LUTHRINGSHAUSEN ET AL  1,985,179
MIRROR ATTACHMENT FOR AUTOMOBILES
Filed May 21, 1934
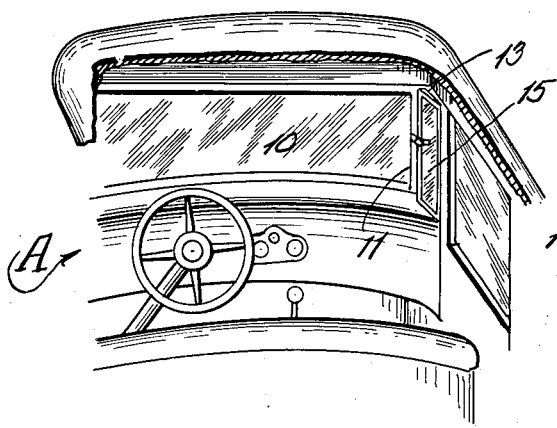
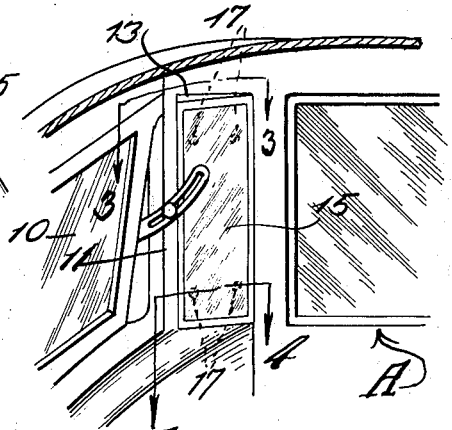
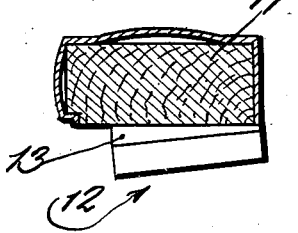
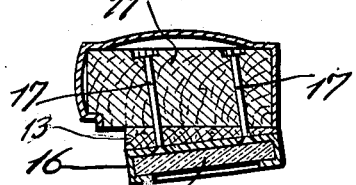
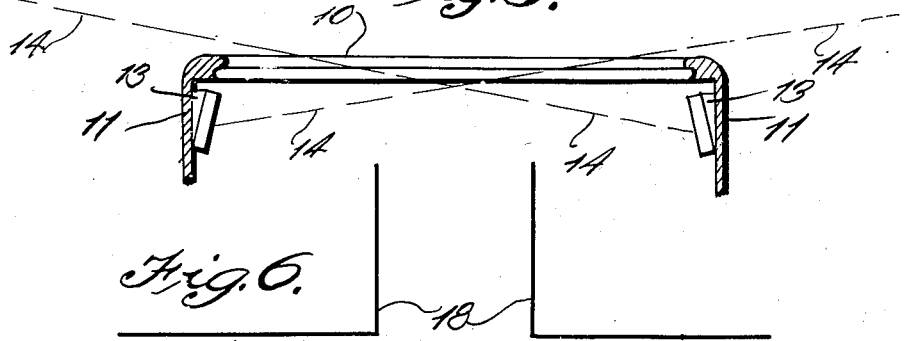
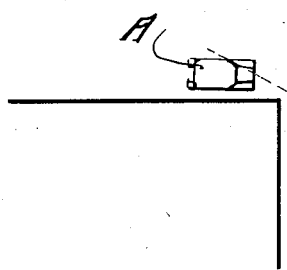
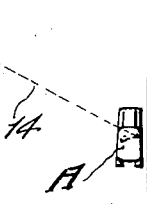

Patented Dec. 18, 1934

1,985,179

UNITED STATES PATENT OFFICE 1,985,179

MIRROR ATTACHMENT FOR AUTOMOBILES

Henry A. Luthringshausen and Isidore Pine, New Orleans, La.

Application May 21, 1934, Serial No. 726,790

1 Claim. (Cl. 45—97)

This invention relates to certain new and useful improvements in mirror attachment for automobiles.

The primary object of the invention is to provide a mirror attachment for automobiles wherein an angularly disposed mirror, which is disposed adjacent the operator's seat and preferably supported on a perpendicular corner post of a windshield, is adapted to reflect cross traffic, such as at street or road intersections, so that the operator of the automobile may be informed of cross traffic in advance of actually entering a street or road intersection.

It is a further object of the invention to locate the reflecting mirror at the right hand end of the windshield so that the operator of the automobile will be particularly advised of cross traffic approaching from the left side at a street or road intersection, the invention further contemplating, however, the location of a mirror at each end of the windshield so that the approach of traffic from both directions can be noted.

With the above and other objects in view becoming apparent as the nature of the invention is better understood, the latter consists in the novel form, combination and arrangement of parts hereinafter more fully described, shown in the accompanying drawing and claimed.

In the drawing:—

Figure 1 is a fragmentary perspective view showing the inner side of the windshield and adjacent side frame and top structure with an angularly disposed mirror supported at the right hand corner post of the windshield;

Figure 2 is a fragmentary perspective view of the inner side of the windshield with the latter partially opened;

Figure 3 is a detail sectional view taken on line 3—3 of Figure 2, showing the mirror supported on the corner post of the windshield frame;

Figure 4 is a detail sectional view taken on line 4—4 of Figure 2, showing the manner of attaching the mirror to the corner post of the windshield frame;

Figure 5 is a detail sectional view of the windshield frame and corner post structure illustrating a mirror supported on each corner post structure; and Figure 6 is a diagrammatic view showing street or road crossings with two automobiles moving at right angles to each other toward the crossing with the automobile approaching from the left reflecting into the mirror of the automobile at the right.

Referring more in detail to the accompanying drawing, the reference character A designates in general, an automobile provided with a windshield 10 hingedly mounted at opposite ends in corner posts 11.

A mirror designated in general by the reference character 12 is preferably of panel formation and is supported on each corner post 11 as diagrammatically illustrated in Figure 5 and the width and length of the mirror 12 is comparable to the corner post 11. A shim or wedge-shaped spacer block 13 is interposed between the mirror 12 and corner post 11 to dispose the mirror at the desired angle for the reflection of cross-traffic as indicated by the broken lines 14 in Figures 5 and 6. The mirror 12 includes a mirror glass 15 per se that is carried by a frame 16 that is bolted as at 17 to the corner post 11 as shown in Figure 4.

It is to be understood that the mirrors 12 may be attached to both corner posts 11, but the invention is primarily designed for the mounting of a mirror upon the right hand end or corner post of the windshield 10 so that the driver of the automobile may be warned of traffic or automobiles approaching from the left hand at street intersections diagrammatically illustrated at 18 in Figure 6.

While there is herein shown and described the preferred embodiment of the invention, it is nevertheless to be understood that minor changes may be made therein without departing from the spirit and scope of the invention as claimed.

We claim:—

In a mirror attachment for automobiles, the combination with a perpendicular corner post of the automobile windshield, of a mirror attachment for the corner post including a metallic frame having a mirror glass therein, a wedge member interposed between the frame and post to position the mirror at the desired angle whereby the driver of the automobile can view in the mirror automobiles approaching from the side opposite the mirror at street intersections and headed bolts extending through the base of the frame, wedge member and corner post for connecting the mirror frame and wedge member to the corner post, the mirror being disposed laterally of the windshield and spaced from the door whereby forward and lateral vision is unobstructed thereby.

HENRY A. LUTHRINGSHAUSEN.
ISIDORE PINE.